United States Patent [19]

Suzuki

[11] Patent Number: 5,500,074
[45] Date of Patent: Mar. 19, 1996

[54] TREAD RING TRANSFERRING APPARATUS FOR USE IN A GREEN TIRE BUILDING SYSTEM

[75] Inventor: Kazuya Suzuki, Shirakawa, Japan

[73] Assignee: Sumitomo Rubber Industries, Ltd., Hyogo, Japan

[21] Appl. No.: 265,276

[22] Filed: Jul. 1, 1994

[30] Foreign Application Priority Data

Jul. 2, 1993 [JP] Japan .................................. 5-190833

[51] Int. Cl.⁶ .................................................. B29D 30/26
[52] U.S. Cl. ...................... 156/406.2; 156/126; 156/396
[58] Field of Search ................................ 156/406.2, 396, 156/127, 126, 111, 96; 269/55, 56, 287

[56] References Cited

U.S. PATENT DOCUMENTS 4,402,782  9/1983  Klose et al. .
4,634,489  1/1987  Dupommier ........................ 156/406.2
5,273,613  12/1993  Sato et al. .......................... 156/406.2

FOREIGN PATENT DOCUMENTS 0326365  8/1989  European Pat. Off. .
2331436  6/1977  France .

*Primary Examiner*—Geoffrey L. Knable

[57] ABSTRACT

A tread ring transferring apparatus for use in a green tire building system, includes a ring-shaped holder frame and a plurality of holding segments carried by the holder frame. The holding segments each have contact members for directly supporting the tread ring being transferred. The contact members are arranged in a circumferential direction of the ring-shaped holder frame at different intervals.

4 Claims, 14 Drawing Sheets

TREAD RING TRANSFERRING APPARATUS FOR USE IN A GREEN TIRE BUILDING SYSTEM

BACKGROUND OF THE INVENTION

This invention relates to an apparatus for transferring a tread ring which is used in a green tire building system.

In green tire building systems, a tread ring is built on a tread ring forming drum, and then transferred from the tread ring forming drum to around carcass plies placed on a tire building drum by a transferring apparatus.

FIG. 8 shows a principal portion of a typical conventional transferring apparatus. The conventional transferring apparatus includes a holder frame 100 in the form of ring and a number of holding segments 101 provided inside the ring-shaved holder frame 100. The holder frame 100 is reciprocally moved from the tread ring forming drum to the tire building drum, and vice versa. Each holding segment 101 has a rectangular contact member 102 on an inner end thereof. The contact members 102 are arranged in a circumferential direction at the same interval. The contact members 102 are moved in radial directions of the ring-shaped holder frame 100. The contact members 102 are simultaneously moved in inner directions to hold the tread ring T while moved in outer directions to release the holding of the tread ring T.

In tires produced with use of the conventional transferring apparatus provided with the contact members 102 arranged at the same interval, however, there have been noticeable Radial Force Variations (referred to as "RFV" hereinafter) in the high variation modes.

It will be seen that vibrations caused by RFVs in the high variation modes are liable to resonate with vibrations of particular members of an automotive vehicle running at high speeds, and generate undesirable noises. Accordingly, there have been demands of reducing the RFV in the high variation modes as low as possible.

SUMMARY OF THE INVENTION

It is an object of the invention to provide an apparatus for transferring a tread ring which has overcome the aforementioned problems in the prior art.

It is another object of the invention to provide a tread ring transferring apparatus which can assure production of tires having reduced RFVs in high variation modes.

According to the present invention, a tread ring transferring apparatus comprises: a holder frame in the form of a ring; a plurality of holding segments carried by the holder frame, each holding segment including: an inside portion projecting from an inner surface of the holder frame and being movable in radial directions of the holder frame; the inside portion having a contact portion operable to come into contact with an outer surface of a tread ring being transferred, the contact portions of the plurality of holding segments being arranged in a circumferential direction at different intervals.

The contact portions may be arranged in such a manner that no interval between any adjacent two contact portions is equal to an angle which is obtained by dividing 360° by the number of contact portions in the arrangement.

It may be appreciated that the inside portion is constructed by an arm member extending and being movable in radial directions of the holder frame; a supporting member attached on an inner end of the arm member, the supporting member extending in a circumferential direction; and a contact member attached on an inner surface of the supporting member.

The contact member may be made to be attachable on a selective position of the inner surface of the supporting member to change the circumferential arrangement of contact members.

The contact member may be shaped into a rectangle whose axial width is equal to or smaller than an axial width of the center flat portion of the tread ring.

The tread ring transferring apparatus, in which contact portions are arranged in a circumferential direction at different intervals, can reduce the high mode RFVs to a considerable low level, and assure production of tires which are unlikely to resonate with vibrations or particular parts of a high speed running automotive vehicle and to generate noises.

The contact portion arrangement in which no interval between any adjacent two contact portions is equal to an angle which is obtained by dividing 360° by the number of contact portions can further reduce the high mode RFVs.

These and other objects, features and advantages of the invention will become more apparent upon a reading of the following detailed disclosure of the preferred embodiments with reference to the appended drawings.

BRIEF DESCRIPTION OF THE DRAWINGS

FIGS. 5A to 5F respectively showing results of the contact member arrangements shown in FIGS. 4A to 4F;

DETAILED DESCRIPTION OF THE PREFERRED EMBODIMENTS OF THE INVENTION

Figure 1:
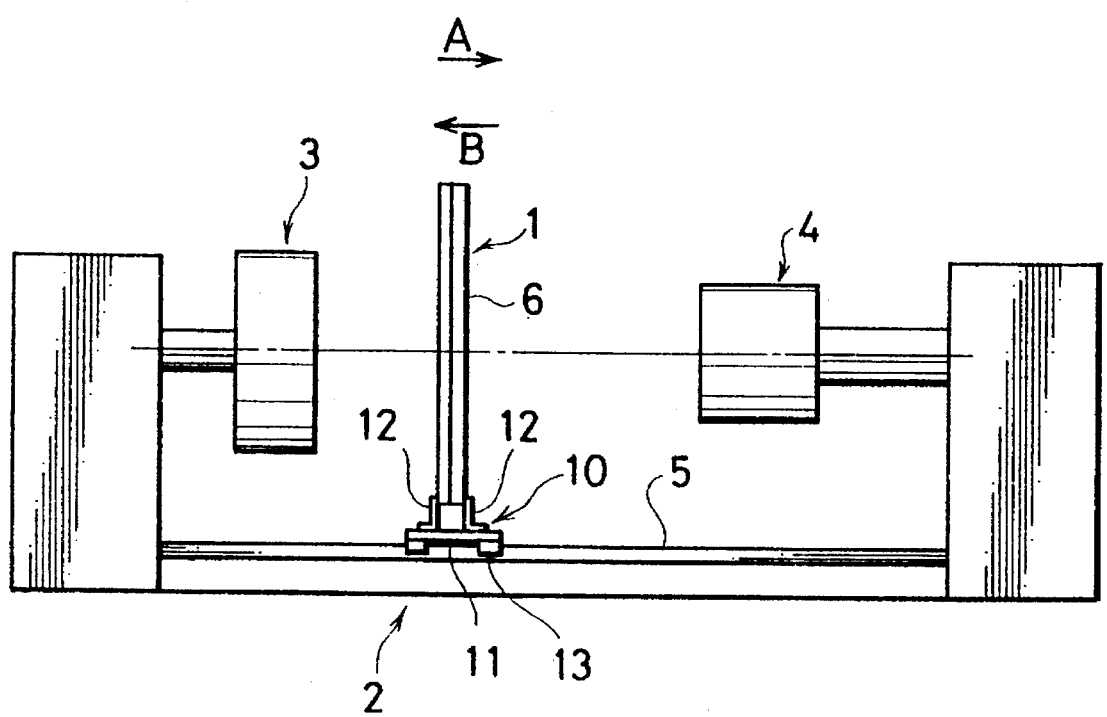
FIG. 1 is a schematic front elevation view of a green tire building system provided with a tread ring transferring apparatus of the present invention.

A preferred embodiment of the present invention will be described with reference to the accompanying drawings. FIG. 1 shows an overall construction of a green tire building system 2 provided with an exemplary tread ring transferring apparatus 1 of the present invention. The green tire building system 2 includes a tread ring forming drum 3 and a tire building drum 4 which are arranged along the same axial line. The tread ring forming drum 3 and tire building drum 4 are contractible and expandable in their respective radial directions.

Between the tread ring forming drum 3 and the tire building drum 4 is provided the tread ring transferring apparatus 1. The tread ring transferring apparatus 1 is reciprocally movable along parallel rails 5 provided in a bottom of the green tire building system 2 as the directions A and B shown in FIG. 1.

Specifically, the tread ring transferring apparatus 1 includes a holder frame 6 in the form of a ring and a base portion 10 for supporting the holder frame 6 in a vertical position. The base portion 10 has a base plate 11, support brackets 12 fixedly attached on a top surface of the base plate 11 for supporting the holder frame 6, and runners 13 fixedly attached on an underside surface of the base plate 11 and slidable along the parallel rails 5.

Figure 2:
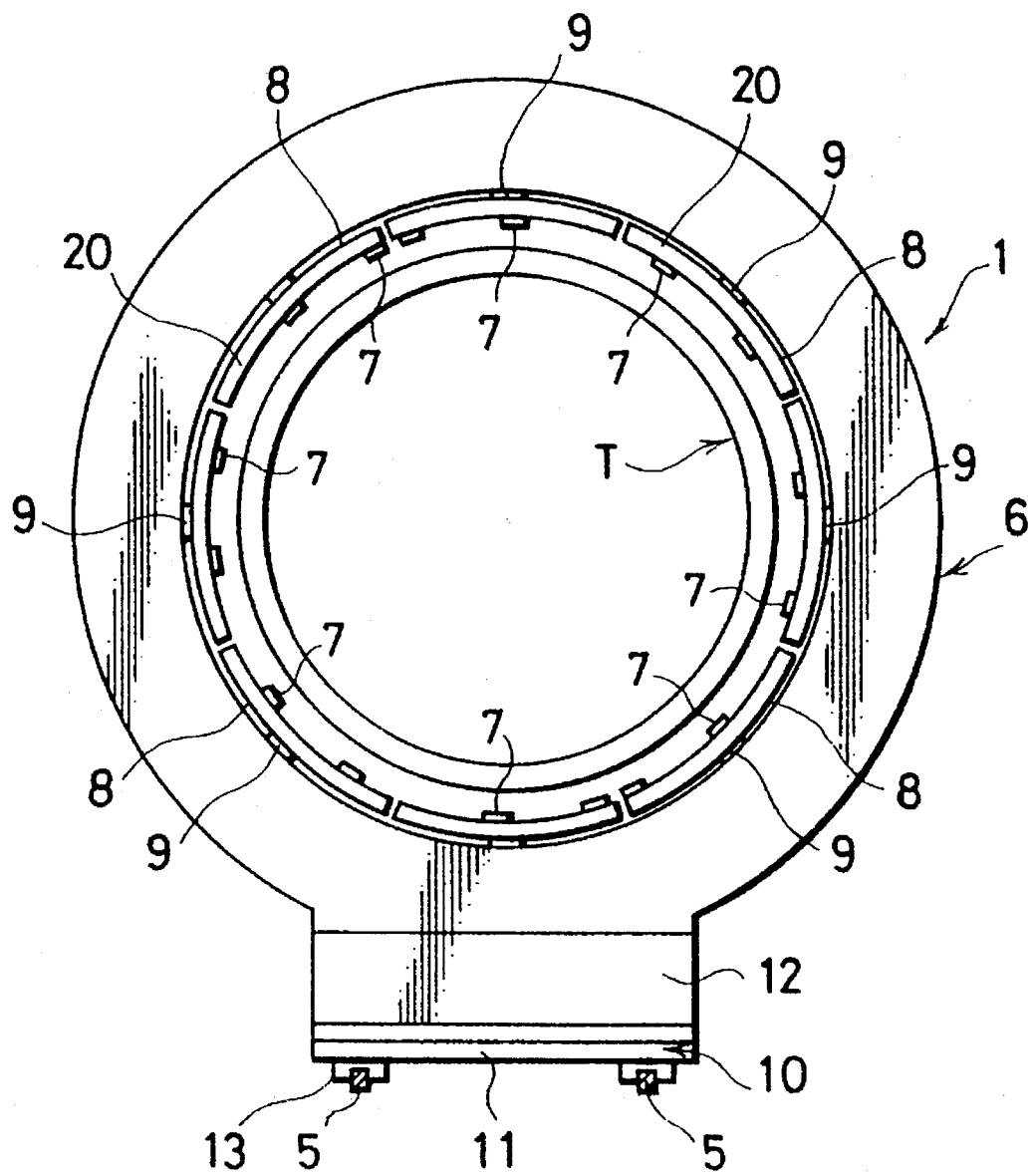
FIG. 2 is an enlarged side elevation view of the tread ring transferring apparatus which is in a state before holding a tread ring.

As shown in FIG. 2, the holder frame 6 carries a plurality of holding segments 20, i.e., eight holding segments 20 in this embodiment, inside the ring-shaped holder frame 6. Each holding segment 20 has an arm member 9, a supporting member 8 in the form of a circular arc and fixedly attached to the arm member 9, and contact members 7 mounted on the supporting member 8. The supporting member 8 has specified width in an axial direction of the ring-shaped holder frame 6.

Figure 3:
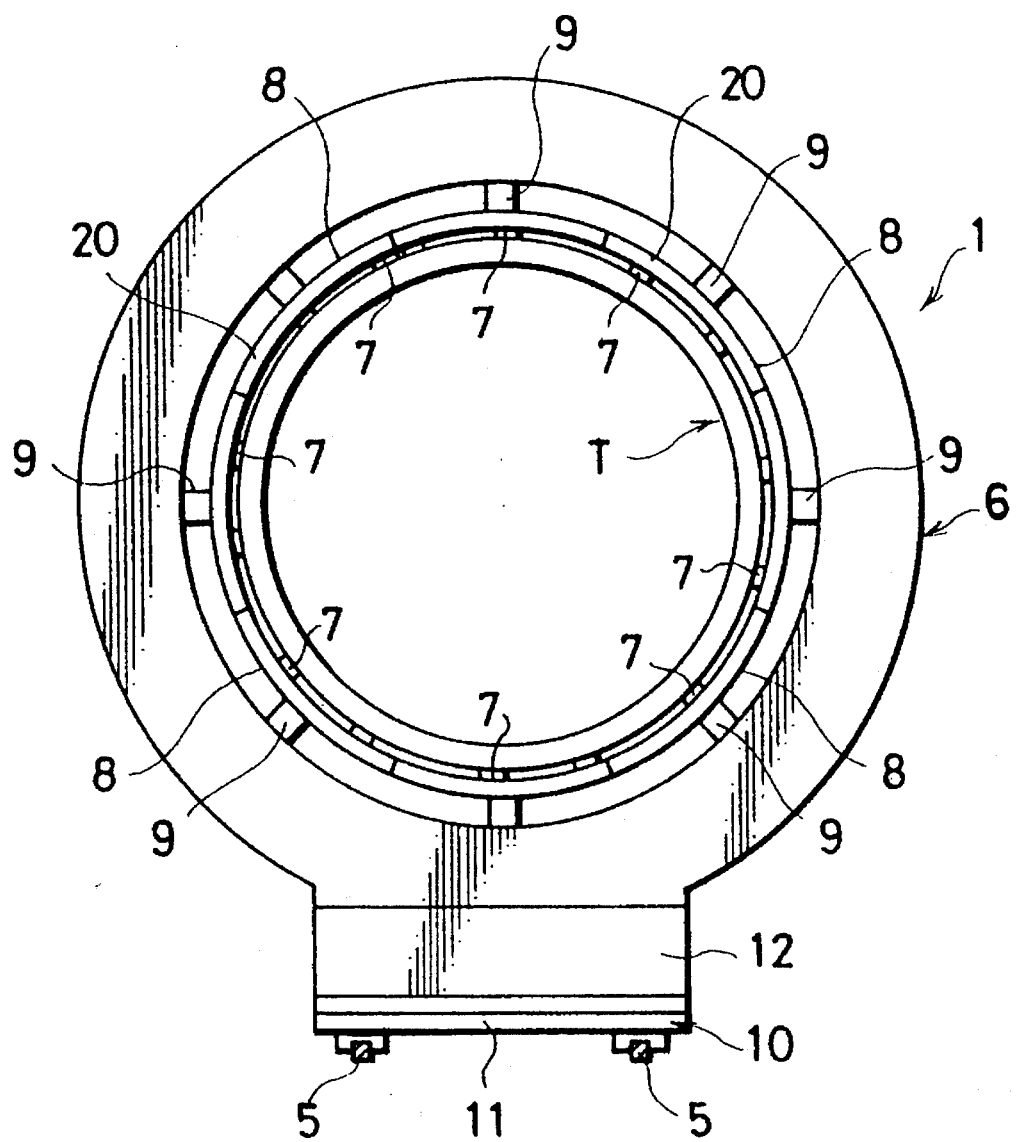
FIG. 3 is an enlarged side elevation view of the tread ring transferring apparatus which is in another state of holding the tread ring.

The supporting members 8 are simultaneously moved in radial directions of the ring-shaped holder frame 6 by a conventional expanding/contracting mechanism. The supporting members 8 are changed from a tread ring holding state to a tread ring releasing slate, and vice versa. The supporting members 8 are moved in their inner directions of the ring-shaped holder frame 6 to provide the holding state while moved in their outer directions to provide the releasing state. FIG. 2 shows the releasing state while FIG. 3 shows the holding state.

The expanding/contracting mechanism is constructed by a single ring member coaxially provided in the holder frame 6 and rotatable around the axis of the holder frame 6, a cylinder for rotating the ring member by a specified amount, link members for connecting the respective arm members 9 of the supporting segments 20 to the ring member, and guide members for keeping the arm members 9 in their respective radial movements.

The supporting members 8 are moved in the inner directions by rotating the ring member of the expanding/contracting mechanism in first direction by the cylinder to move the arm members in the inner directions. The supporting members 8 are moved in the outer directions by rotating the ring member in a second direction opposite to the first direction to move the arm members 9 in the outer directions.

On an inner surface of each supporting member 8 are mounted contact members 7. The contact members 7 are arranged on the respective inner surfaces of the supporting members 8 in such a manner that spaces between adjacent contact members 7 define predetermined distances or intervals in an inner circumference of the supporting members 8 in the holding state. The predetermined intervals will be described later.

It may be preferable to change the interval between contact members 7, that to change the arrangement of contact members 7. For example, a plurality of threaded holes are formed in the inner surface of the supporting member 8. On other hand, the contact member 7 is formed with a threaded projection. Contact members 7 are removably mounted at selective positions of the respective inner surfaces of the supporting members 8 to change the intervals between contact members or change the arrangement of contact members 7.

Referring again to FIG. 1, next, a brief description will be made about production of a green tire in the green tire building system 2. Carcass plies are wound on the tire building drum 4. A tread ring T is formed on the tread ring forming drum. The transferring apparatus 1 is moved along the rails 5 to the tread ring forming drum 3, and the supporting members 8 are moved in the inner directions or contracted to the holding state so that the tread ring T is held by the contact members 7. After the tread ring T is held by the contact members 7, the tread ring forming drum 3 is contracted to allow the tread ring T to be transferred by the tread ring transferring apparatus 1.

The transferring apparatus 1 is moved holding the tread ring T from the tread ring forming drum 3 to the tire building drum 4. After the tread ring T is positioned around the carcass plies, the carcass plies are deformed into a toroidal shape until an outer circumference of the carcass plies comes into contact with and adheres to an inner surface of the tread ring T to build a green tire. Thereafter, the supporting members 8 are moved in the outer directions or expanded into the releasing state and the transferring apparatus 1 is then returned to the initial position.

FIGS. 4A to 4F show various arrangements of contact members 7 which are settable on the inner surfaces of the supporting members 8 of the tread ring transferring apparatus 1.

The contact member 7 is shaped into a rectangle whose axial width is substantially equal to a width of a center flat portion of the tread ring. If the width of the contact member 7 is so large that the contact member 7 comes into contact with both shoulder portions positioned axially outside the center flat portion, the RFV in high variation modes will increase.

In the case of transferring a tread ring whose circumference is 1800 mm length, for example, the contact member 7 is shaped into a rectangle whose axial width is 50 mm and whose circumferential length is 30 mm.

Figure 4A:
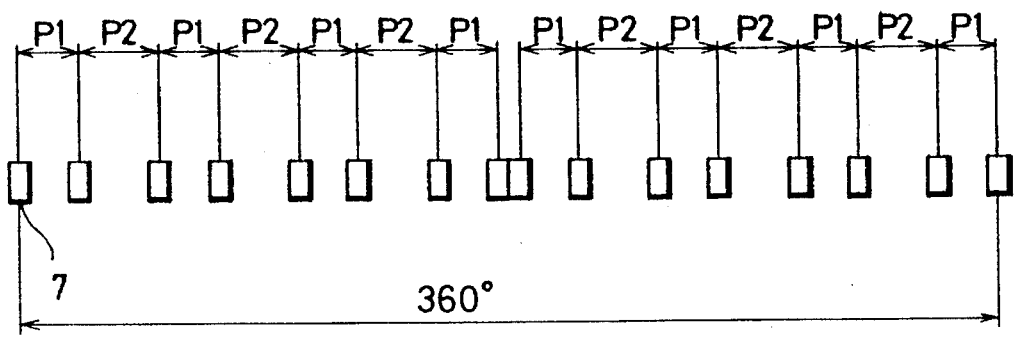
FIGS. 4A to 4F are diagrams showing various circumferential arrangements of contact members for the tread ring transferring apparatus.

Specifically, FIG. 4A shows a fourteen-interval arrangement which has eight first intervals P1 of 22.5° and six second intervals P2 of 28.125°.

Figure 4B:
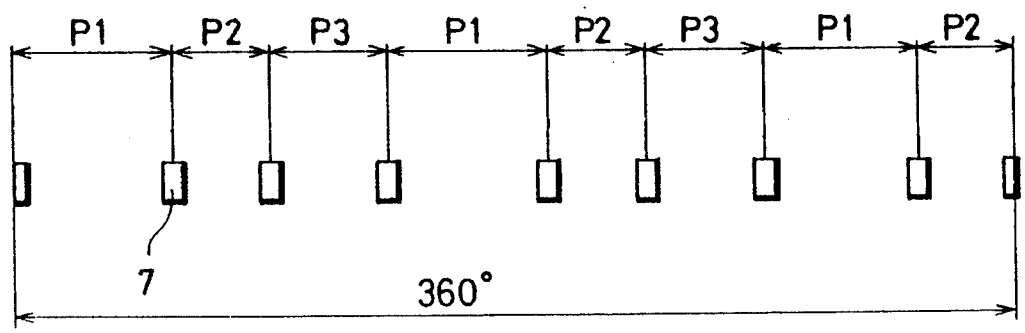

FIG. 4B shows an eight-interval arrangement which has three first intervals P1 of 53.6°, three second intervals P2 of 37°, and two third intervals P3 of 44.1°.

Figure 4C:
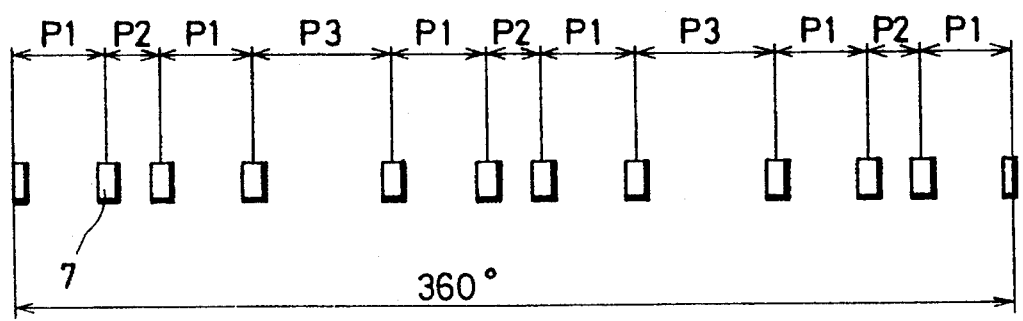

FIG. 4C shows an eleven-interval arrangement which has six first intervals P1 of 34°, three second intervals P2 of 20.8°, and two third intervals P3 of 46.8°.

Figure 4D:
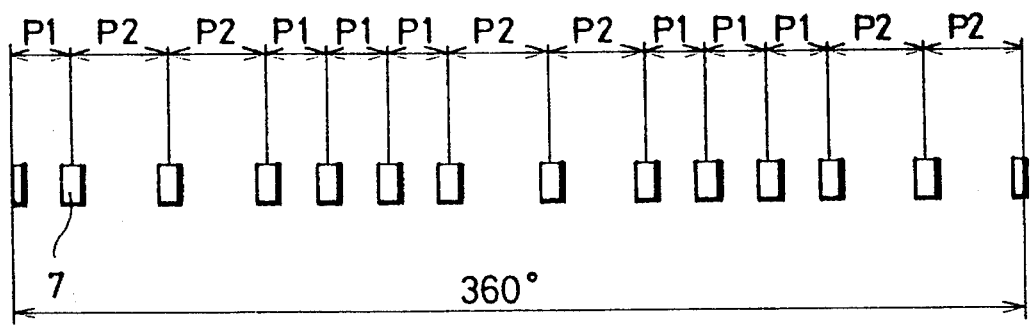

FIG. 4D shows a thirteen-interval arrangement which has seven first intervals P1 of 336°/15 and six second intervals P2 of 508°/15.

In the arrangements shown in FIGS. 4A to 4D, the contact members 7 are arranged in such a manner that no interval between any adjacent two contact members is equal to an angle which is obtained by dividing 360° by the number of contact members in the arrangement. For example, in an arrangement of two contact members no interval is equal to 360°/2; any adjacent two of three contact members have no interval equal to 360°/3; any adjacent two of four contact members have no interval equal to 360°/4; any adjacent two of arbitrary five contact members have no interval equal to 360°/5; any adjacent two of six contact members have no interval equal to 360°/6; and so on.

It may be preferable to set the interval between any adjacent two contact members three or more degrees smaller or greater than an angle of 360° divided by the number of contact members.

Figure 4E:
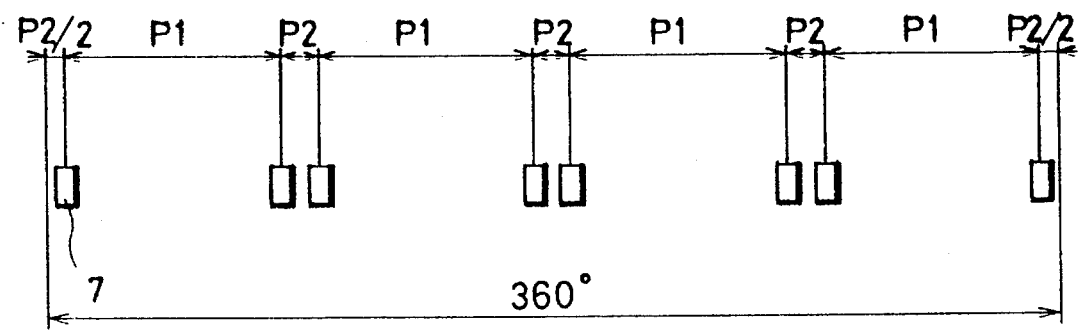

FIG. 4E shows an eight-interval arrangement which has four first intervals P1 of 72.5° and four second intervals P2 of 17.5°.

Figure 4F:
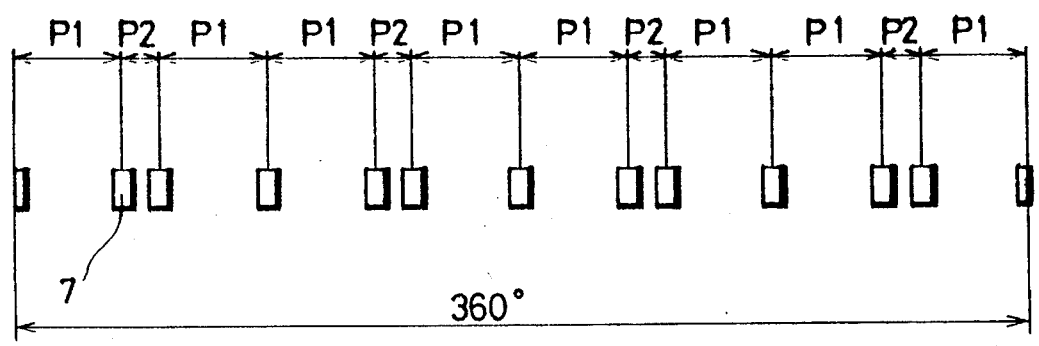

FIG. 4F shows a twelve-interval arrangement which has eight first intervals P1 of 36.3° and four second intervals P2 of 17.4°.

TABLE 1 shows results of RFV measurement test of tires which were actually produced with the use of the above-described tread ring transferring apparatus having the contact member arrangement shown in FIG. 4A. In this test, eighteen tires were produced. The size of the tires was 185/70R13; the inside pressure was 2.0 kg/cm$^2$; the load was 344 kg; and the rim size was 5JJ×13 inch.

In TABLE 1: "SP 1" to "SP 18" in the left column respectively denote sample tires 1 to 18 actually produced with the use of the tread ring transferring apparatus; "MEAN" denotes mean RFVs of the eighteen samples; "σ" denotes standard deviations: "MAX" denotes maximum RFVs of the eighteen samples; and "MIN" denotes minimum RFVs of the eighteen samples. "1ST" to "10TH" in the top line denote the first to tenth variation modes: and "OA" denotes the overall variation.

TABLE 1

| | RFV IN MODES | | | | | | | | | | |
|---|---|---|---|---|---|---|---|---|---|---|---|
| | OA | 1ST | 2ND | 3RD | 4TH | 5TH | 6TH | 7TH | 8TH | 9TH | 10TH |
| SP 1 | 3.9 | 1.3 | 1.8 | 1.1 | 0.7 | 0.4 | 0.4 | 0.2 | 0.1 | 0.0 | 0.0 |
| SP 2 | 6.3 | 3.8 | 2.3 | 1.4 | 0.7 | 0.8 | 0.1 | 0.0 | 0.0 | 0.1 | 0.0 |
| SP 3 | 6.9 | 5.1 | 1.8 | 0.6 | 0.1 | 0.4 | 0.2 | 0.1 | 0.1 | 0.1 | 0.0 |
| SP 4 | 4.8 | 3.2 | 1.2 | 1.5 | 0.4 | 0.1 | 0.2 | 0.1 | 0.2 | 0.0 | 0.0 |
| SP 5 | 2.9 | 1.7 | 1.2 | 0.8 | 0.3 | 0.6 | 0.3 | 0.1 | 0.1 | 0.0 | 0.1 |
| SP 6 | 5.5 | 3.3 | 2.4 | 1.0 | 0.3 | 0.4 | 0.2 | 0.2 | 0.2 | 0.1 | 0.1 |
| SP 7 | 4.0 | 3.3 | 1.3 | 0.5 | 0.3 | 0.5 | 0.1 | 0.2 | 0.1 | 0.0 | 0.1 |
| SP 8 | 5.4 | 2.4 | 2.5 | 1.2 | 0.6 | 0.7 | 0.2 | 0.2 | 0.1 | 0.1 | 0.1 |
| SP 9 | 4.8 | 4.0 | 0.3 | 1.0 | 0.3 | 0.5 | 0.1 | 0.1 | 0.2 | 0.1 | 0.1 |
| SP 10 | 5.0 | 2.1 | 2.7 | 1.1 | 0.6 | 0.5 | 0.1 | 0.0 | 0.1 | 0.1 | 0.0 |
| SP 11 | 6.3 | 4.4 | 1.7 | 1.8 | 0.3 | 0.5 | 0.0 | 0.1 | 0.1 | 0.1 | 0.0 |
| SP 12 | 4.0 | 3.3 | 0.8 | 0.7 | 0.5 | 0.4 | 0.3 | 0.1 | 0.2 | 0.0 | 0.1 |
| SP 13 | 5.6 | 3.7 | 1.5 | 1.8 | 0.2 | 0.2 | 0.2 | 0.2 | 0.2 | 0.1 | 0.0 |
| SP 14 | 3.5 | 1.4 | 2.0 | 1.3 | 0.3 | 0.6 | 0.3 | 0.2 | 0.0 | 0.1 | 0.0 |
| SP 15 | 3.7 | 2.5 | 1.7 | 0.9 | 1.0 | 0.4 | 0.2 | 0.2 | 0.1 | 0.0 | 0.0 |
| SP 16 | 6.2 | 4.2 | 2.5 | 1.9 | 0.5 | 0.7 | 0.2 | 0.0 | 0.2 | 0.1 | 0.0 |
| SP 17 | 5.2 | 4.1 | 0.4 | 0.4 | 0.5 | 0.6 | 0.2 | 0.1 | 0.1 | 0.1 | 0.1 |
| SP 18 | 4.6 | 2.1 | 1.2 | 2.0 | 0.1 | 0.4 | 0.5 | 0.1 | 0.1 | 0.1 | 0.0 |
| MEAN | 4.9 | 3.1 | 1.6 | 1.2 | 0.4 | 0.5 | 0.2 | 0.1 | 0.1 | 0.1 | 0.0 |
| σ | 1.1 | 1.1 | 0.7 | 0.5 | 0.2 | 0.2 | 0.1 | 0.1 | 0.1 | 0.0 | 0.0 |
| MAX | 6.9 | 5.1 | 2.7 | 2.0 | 1.0 | 0.8 | 0.5 | 0.2 | 0.2 | 0.1 | 0.1 |
| MIN | 2.9 | 1.3 | 0.3 | 0.4 | 0.1 | 0.1 | 0.0 | 0.0 | 0.0 | 0.0 | 0.0 |

In the arrangements shown in FIGS. 4E to 4F, the contact members are arranged in such a manner that no interval between any adjacent two contact members is equal to an angle which is obtained by dividing 360° by the number of contact members in the arrangement. Specifically, in FIG. 4E, one first interval P1 and one second intervals P2 are alternately arranged four times. Accordingly, the interval between every three adjacent contact members equals 360°/4. Also, in FIG. 4F, two first intervals P1 and one second interval P2 are alternately arranged four times. Accordingly, the interval between every four adjacent contact members equals 360°/4.

Figure 5A:
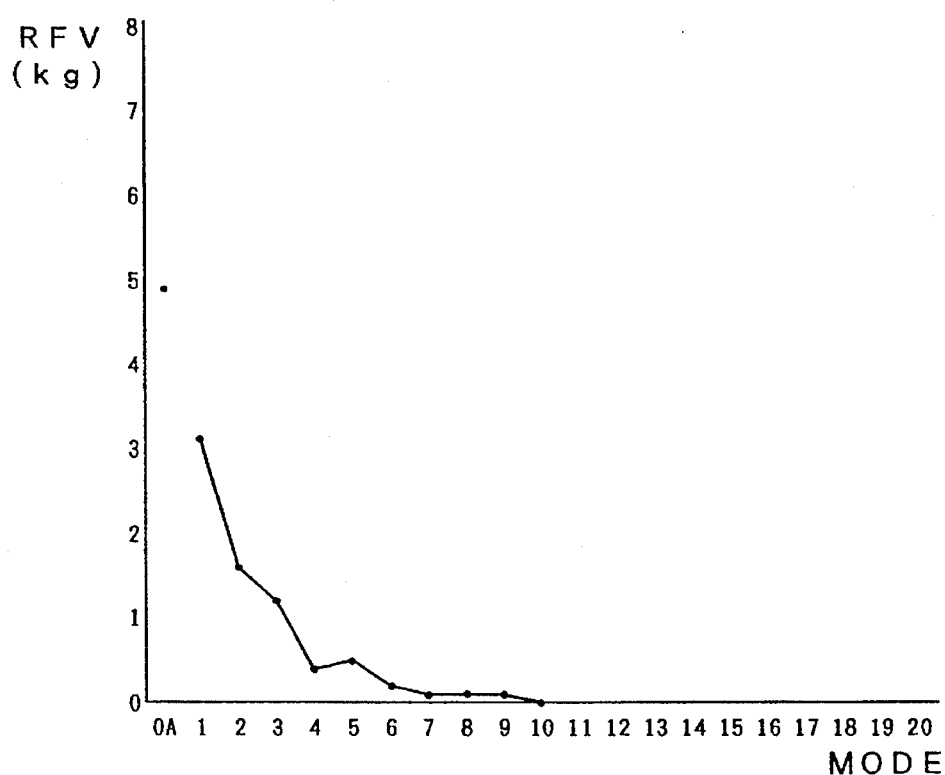
FIGS. 5A to 5F are graphs showing relationships between RFVs and variation modes in tires produced with use of the present tread ring transferring apparatus.
Figure 5B:
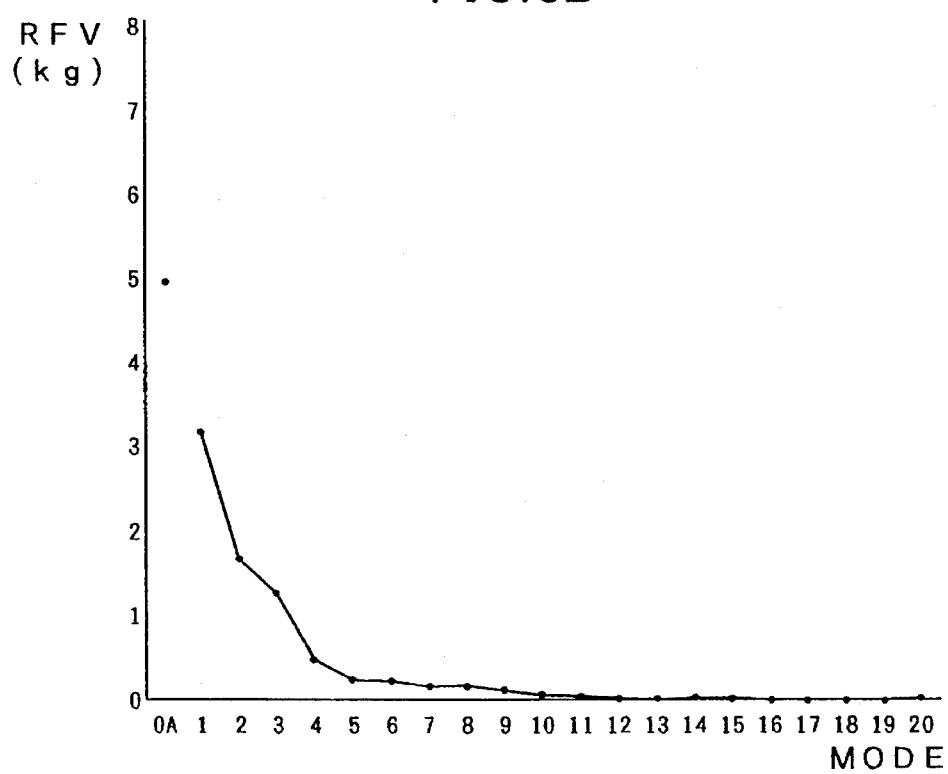
Figure 5C:
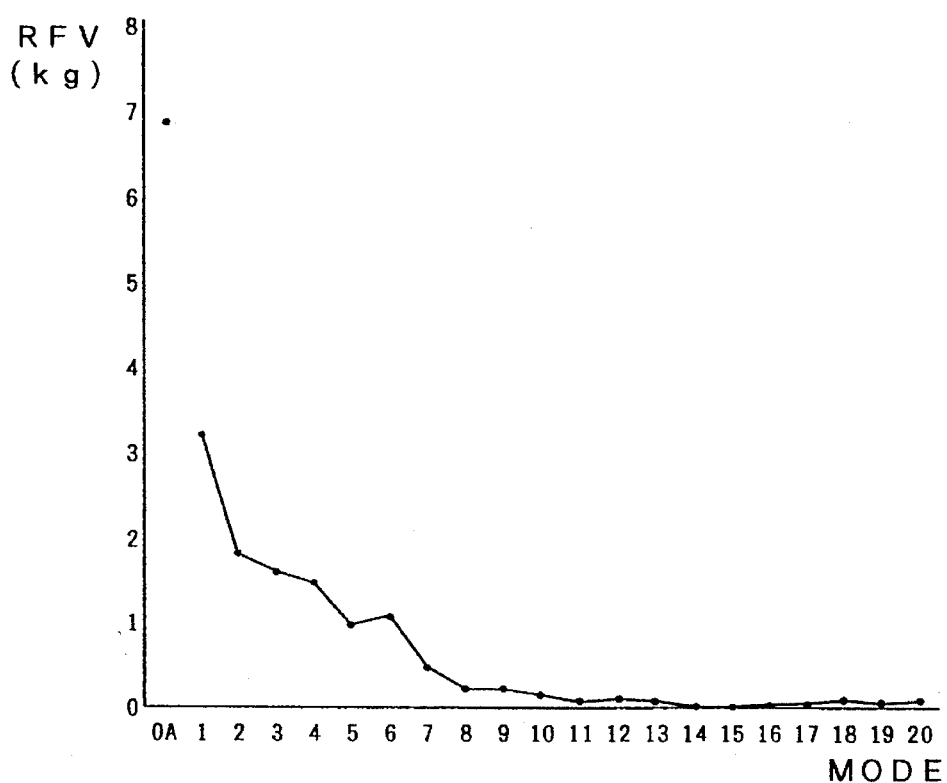
Figure 5D:
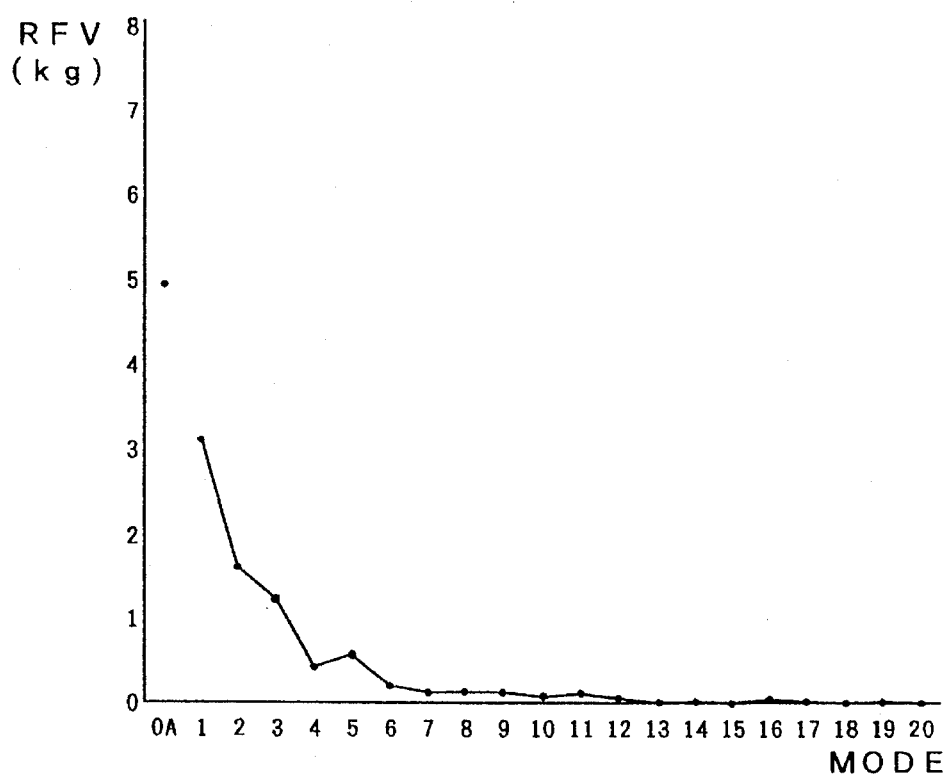

FIG. 5A graphically represents the respective mean RFVs of the eighteen samples in the first to tenth variation modes in TABLE 1.

TABLEs 2 to 6 shows results of RFV measurement test of tires which were actually produced with the use of the above-described tread ring transferring apparatus having the contact member arrangements shown in FIGS. 4B to 4F. The tests were similar to the test for TABLE 1. In the tests for TABLEs 2 to 6. however, measurements were carried out with respect to the first to twentieth variation modes. TABLEs 2 to 6 show only mean RFVs of a number of samples in the first to twentieth variation modes for simplicity.

TABLE 2

| | RFV IN MODES | | | | | | | | | | | |
|---|---|---|---|---|---|---|---|---|---|---|---|---|
| | OA | 1ST | 2ND | 3RD | 4TH | 5TH | 6TH | 7TH | 8TH | 9TH | 10TH | 11TH |

TABLE 2-continued

| | | | | | | | | | | | | |
|---|---|---|---|---|---|---|---|---|---|---|---|---|
| MEAN | 4.95 | 3.16 | 1.67 | 1.25 | 0.48 | 0.24 | 0.23 | 0.17 | 0.18 | 0.11 | 0.07 | 0.05 |
| | 12TH | 13TH | 14TH | 15TH | 16TH | 17TH | 18TH | 19TH | 20TH | | | |
| MEAN | 0.03 | 0.01 | 0.03 | 0.03 | 0.01 | 0.01 | 0.01 | 0.01 | 0.02 | | | |

TABLE 3

| | RFV IN MODES | | | | | | | | | | | |
|---|---|---|---|---|---|---|---|---|---|---|---|---|
| | OA | 1ST | 2ND | 3RD | 4TH | 5TH | 6TH | 7TH | 8TH | 9TH | 10TH | 11TH |
| MEAN | 6.86 | 3.23 | 1.82 | 1.62 | 1.48 | 0.98 | 1.09 | 0.48 | 0.22 | 0.22 | 0.15 | 0.08 |
| | 12TH | 13TH | 14TH | 15TH | 16TH | 17TH | 18TH | 19TH | 20TH | | | |
| MEAN | 0.11 | 0.09 | 0.03 | 0.03 | 0.05 | 0.07 | 0.10 | 0.07 | 0.09 | | | |

TABLE 4

| | RFV IN MODES | | | | | | | | | | | |
|---|---|---|---|---|---|---|---|---|---|---|---|---|
| | OA | 1ST | 2ND | 3RD | 4TH | 5TH | 6TH | 7TH | 8TH | 9TH | 10TH | 11TH |
| MEAN | 4.93 | 3.12 | 1.61 | 1.24 | 0.43 | 0.58 | 0.21 | 0.13 | 0.14 | 0.14 | 0.08 | 0.12 |
| | 12TH | 13TH | 14TH | 15TH | 16TH | 17TH | 18TH | 19TH | 20TH | | | |
| MEAN | 0.07 | 0.01 | 0.03 | 0.01 | 0.05 | 0.02 | 0.01 | 0.02 | 0.00 | | | |

TABLE 5

| | RFV IN MODES | | | | | | | | | | | |
|---|---|---|---|---|---|---|---|---|---|---|---|---|
| | OA | 1ST | 2ND | 3RD | 4TH | 5TH | 6TH | 7TH | 8TH | 9TH | 10TH | 11TH |
| MEAN | 5.69 | 3.09 | 2.11 | 0.61 | 2.18 | 1.00 | 0.77 | 0.10 | 0.12 | 0.18 | 0.04 | 0.06 |
| | 12TH | 13TH | 14TH | 15TH | 16TH | 17TH | 18TH | 19TH | 20TH | | | |
| MEAN | 0.16 | 0.09 | 0.08 | 0.12 | 0.04 | 0.07 | 0.11 | 0.03 | 0.09 | | | |

TABLE 6

| | RFV IN MODES | | | | | | | | | | | |
|---|---|---|---|---|---|---|---|---|---|---|---|---|
| | OA | 1ST | 2ND | 3RD | 4TH | 5TH | 6TH | 7TH | 8TH | 9TH | 10TH | 11TH |
| MEAN | 5.55 | 2.56 | 0.87 | 0.45 | 2.88 | 0.64 | 0.73 | 0.67 | 0.21 | 0.20 | 0.11 | 0.08 |
| | 12TH | 13TH | 14TH | 15TH | 16TH | 17TH | 18TH | 19TH | 20TH | | | |
| MEAN | 0.10 | 0.04 | 0.10 | 0.05 | 0.04 | 0.06 | 0.02 | 0.04 | 0.05 | | | |

FIGS. 5B to 5F graphically show the mean RFVs shown in TABLEs 2 to 6.

Next, comparative tests were carried out to confirm the advantageous features of the present invention. The comparative tests were carried out in the same way as the above tests for the present invent ion except for the contact members being arranged at the same intervals. FIGS. 6A to 6E show various contact member arrangements which were set in the comparative tests.

Figure 6A:
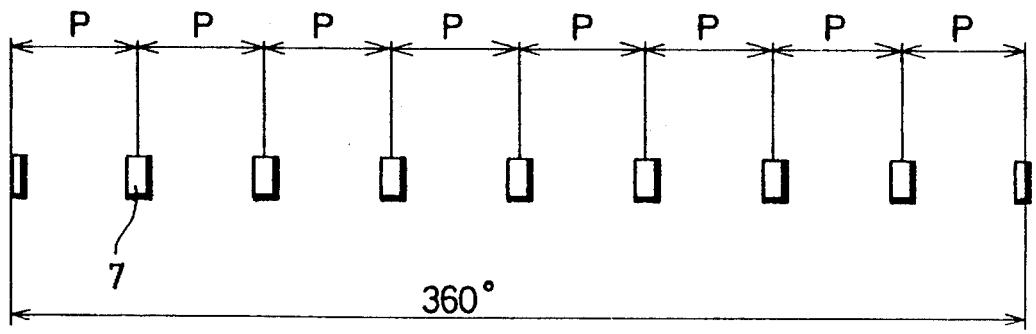
FIGS. 6A to 6E are diagrams showing various circumferential arrangements of contact member's having the same interval as conventional tread ring transferring apparatus.

Specifically, FIG. 6A shows an eight-interval arrangement which has eight intervals P of 45°.

Figure 6B:
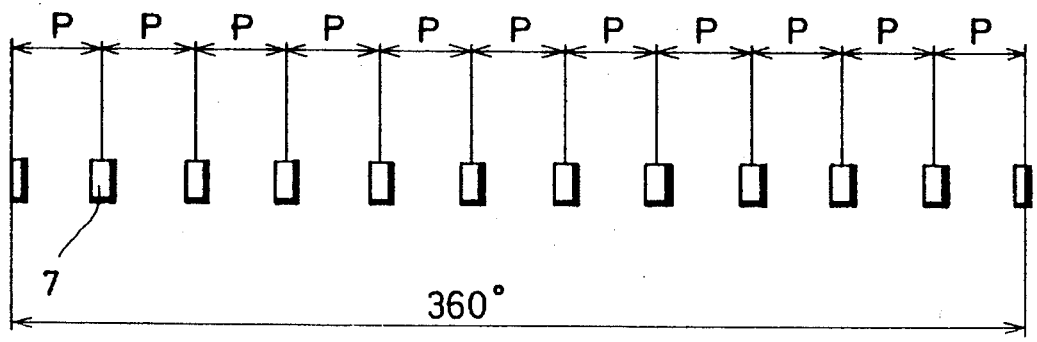

FIG. 6B shows an eleven-interval arrangement which has eleven intervals P of 360°/11.

Figure 6C:
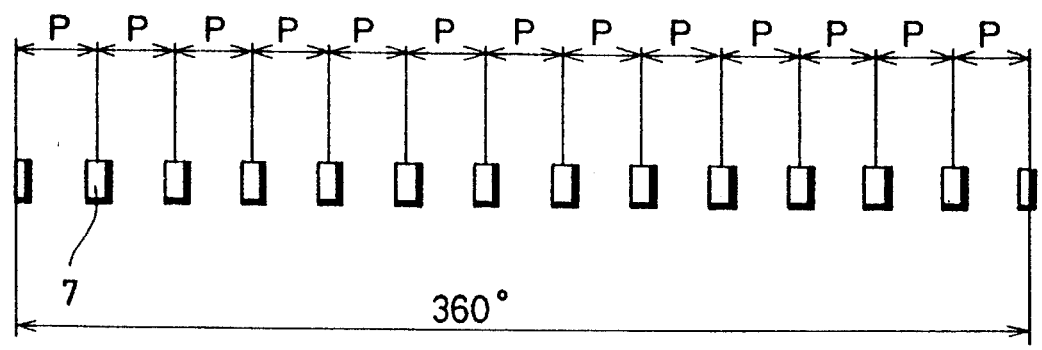

FIG. 6C shows a thirteen-interval arrangement which has thirteen intervals P of 360°/13.

Figure 6D:
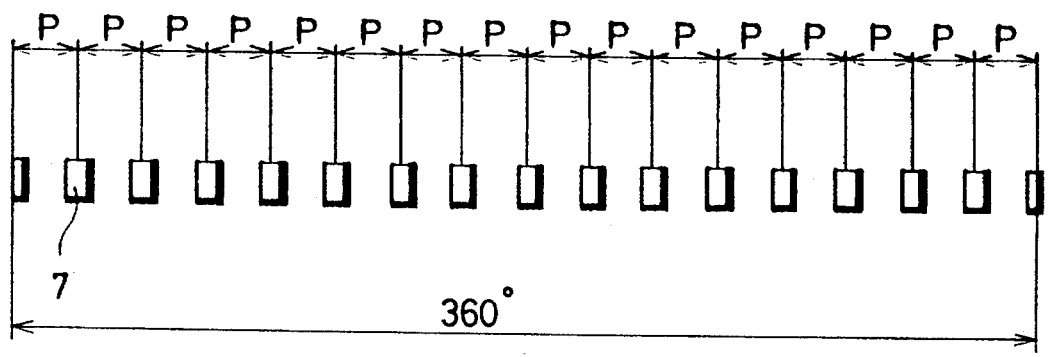

FIG. 6D shows a sixteen-interval arrangement which has sixteen intervals P of 360°/16.

Figure 6E:
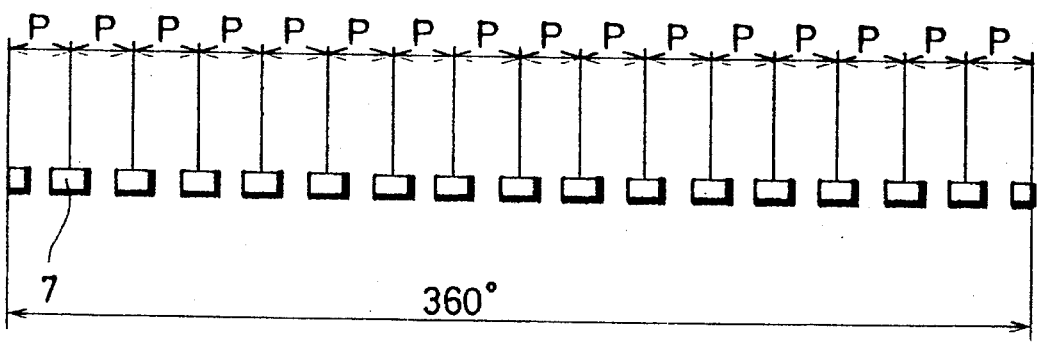
Figure 7A:
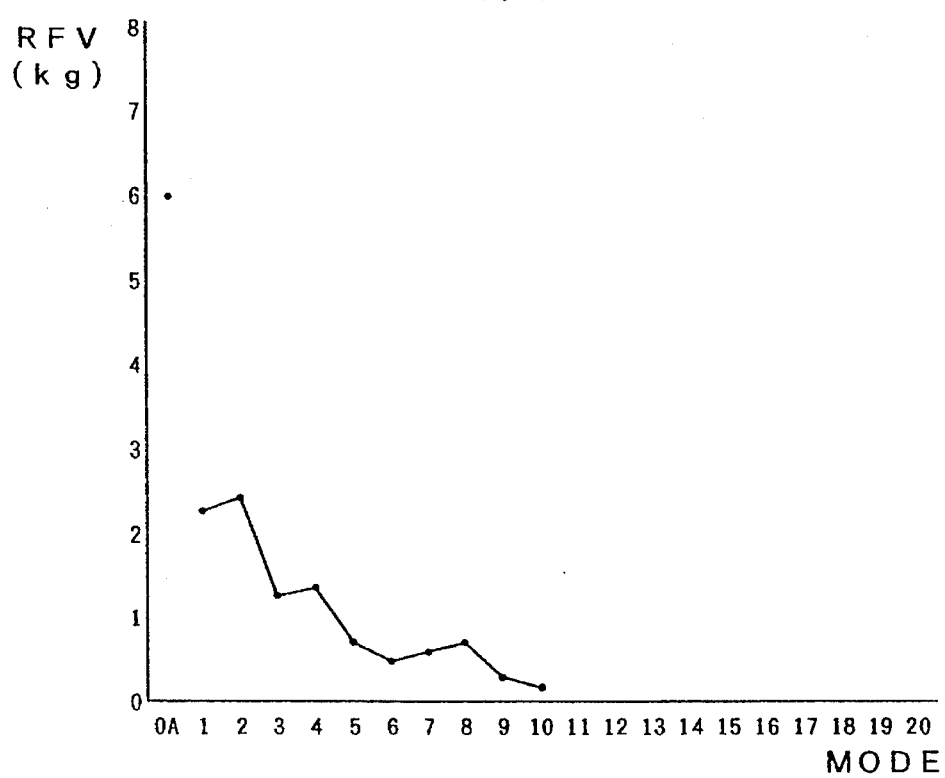
FIGS. 7A to 7E are graphs showing relationships between RFVs and variation modes in a tire produced with use of the conventional contact member arrangements shown in FIGS. 6A to 6E, FIGS. 7A to 7E respectively showing results of the contact member arrangements shown in FIGS. 6A to 6E.
Figure 7B:
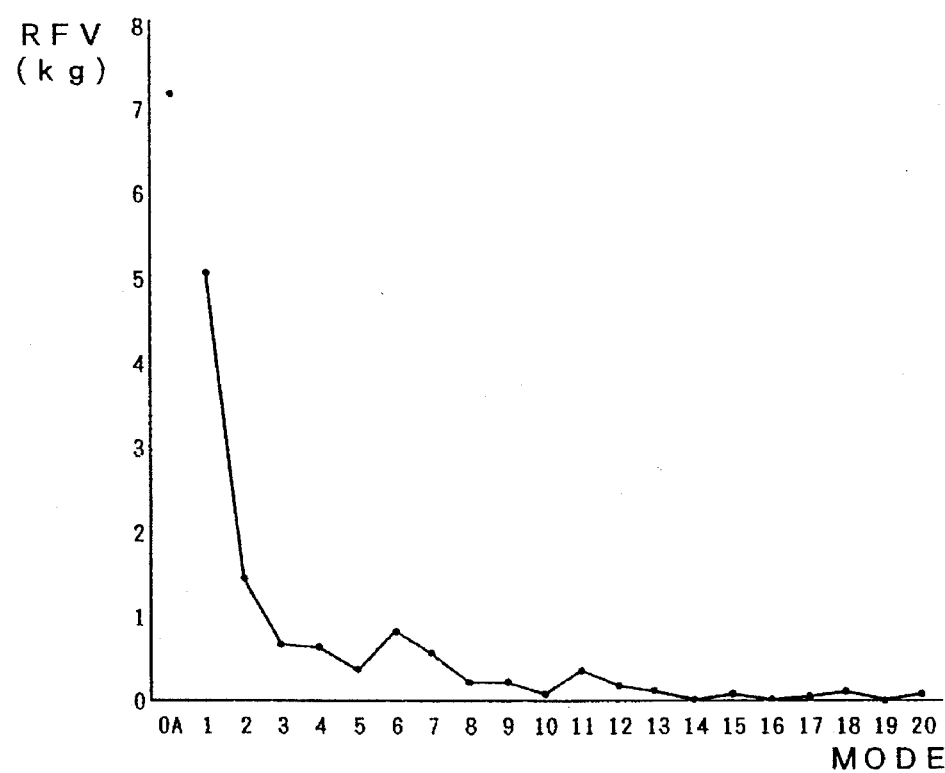
Figure 7C:
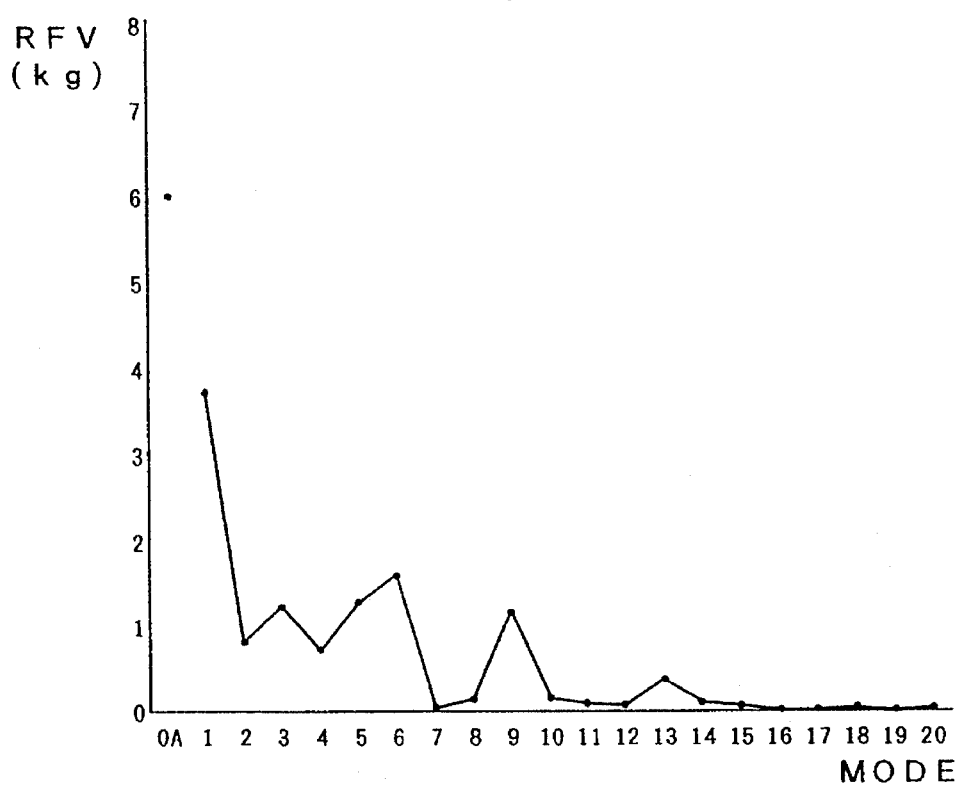
Figure 7D:
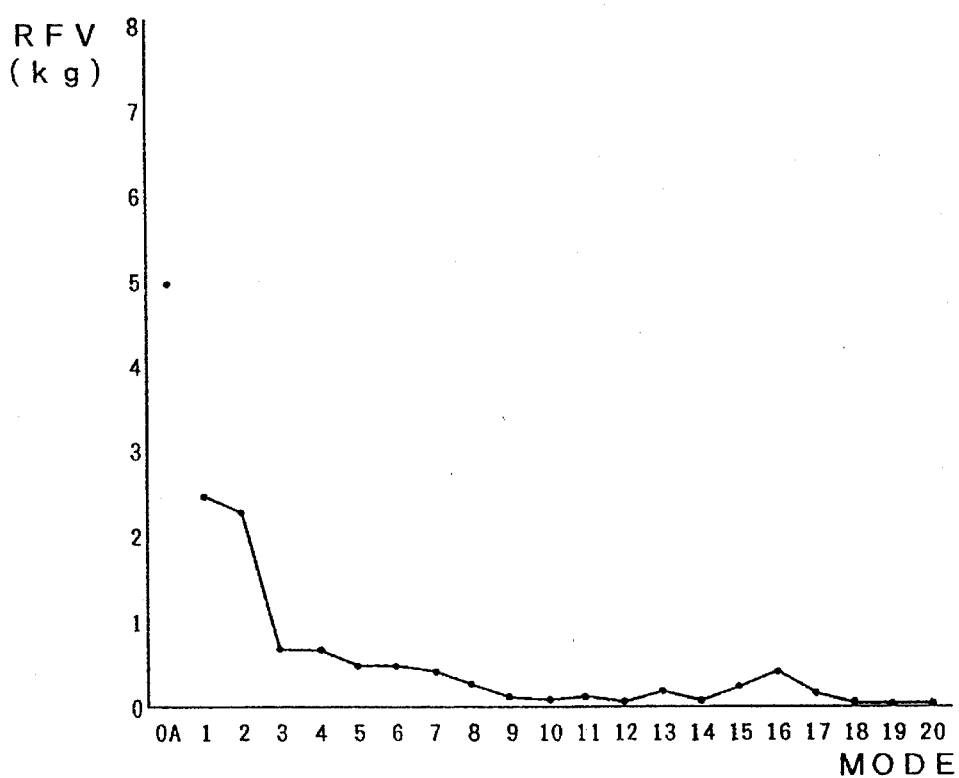
Figure 7E:
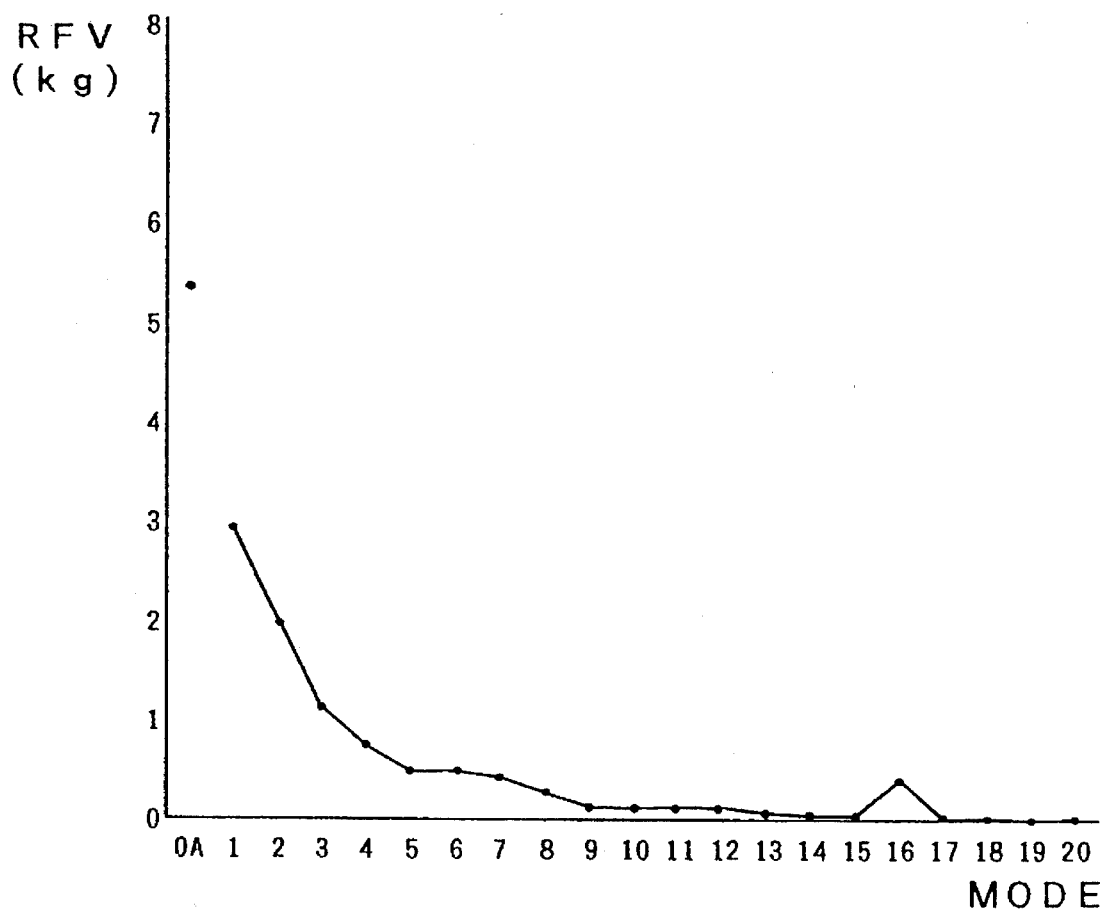
Figure 8:
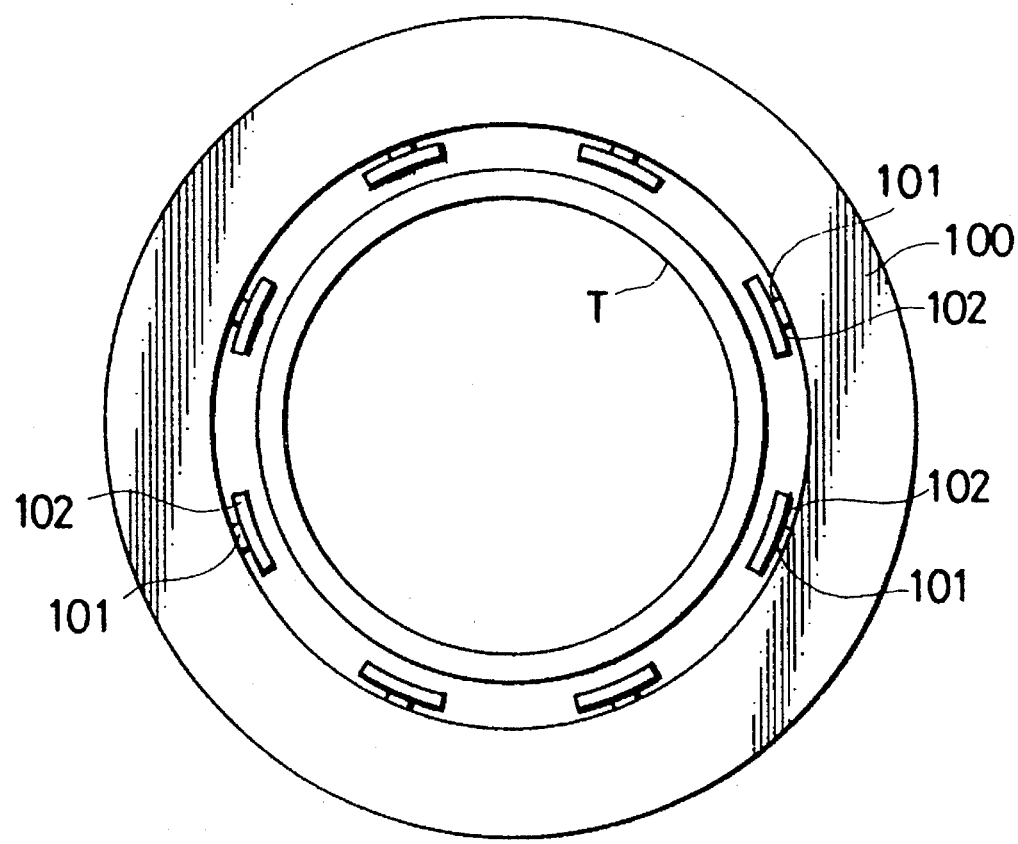
FIG. 8 is a side elevation view of a conventional tread ring transferring apparatus.

FIG. 6E shows a sixteen-interval arrangement which has sixteen intervals P of 360°/16. In this arrangement, however, the contact member is arranged in such a manner that its length of 50 mm is along the circumferential direction of the ring of supporting members and its width of 30 mm is along the axial direction of the supporting member ring.

TABLEs 7 to 11 show results of RFV measurement tests of tires which were actually produced with the use of tread ring transferring apparatus having the contact member arrangements shown in FIGS. 6A to 6E.

TABLE 7

| | RFV IN MODES | | | | | | | | | | |
|---|---|---|---|---|---|---|---|---|---|---|---|
| | OA | 1ST | 2ND | 3RD | 4TH | 5TH | 6TH | 7TH | 8TH | 9TH | 10TH |
| MEAN | 6.01 | 2.27 | 2.45 | 1.28 | 1.37 | 0.70 | 0.48 | 0.60 | 0.70 | 0.30 | 0.18 |

TABLE 8

| | RFV IN MODES | | | | | | | | | | | |
|---|---|---|---|---|---|---|---|---|---|---|---|---|
| | OA | 1ST | 2ND | 3RD | 4TH | 5TH | 6TH | 7TH | 8TH | 9TH | 10TH | 11TH |
| MEAN | 7.20 | 5.05 | 1.44 | 0.68 | 0.64 | 0.37 | 0.84 | 0.56 | 0.22 | 0.23 | 0.09 | 0.37 |
| | 12TH | 13TH | 14TH | 15TH | 16TH | 17TH | 18TH | 19TH | 20TH | | | |
| MEAN | 0.19 | 0.11 | 0.03 | 0.09 | 0.03 | 0.07 | 0.12 | 0.03 | 0.09 | | | |

TABLE 9

| | RFV IN MODES | | | | | | | | | | | |
|---|---|---|---|---|---|---|---|---|---|---|---|---|
| | OA | 1ST | 2ND | 3RD | 4TH | 5TH | 6TH | 7TH | 8TH | 9TH | 10TH | 11TH |
| MEAN | 6.02 | 3.72 | 0.81 | 1.25 | 0.72 | 1.30 | 1.63 | 0.05 | 0.15 | 1.19 | 0.17 | 0.10 |
| | 12TH | 13TH | 14TH | 15TH | 16TH | 17TH | 18TH | 19TH | 20TH | | | |
| MEAN | 0.08 | 0.39 | 0.12 | 0.08 | 0.03 | 0.03 | 0.05 | 0.02 | 0.04 | | | |

TABLE 10

| | RFV IN MODES | | | | | | | | | | | |
|---|---|---|---|---|---|---|---|---|---|---|---|---|
| | OA | 1ST | 2ND | 3RD | 4TH | 5TH | 6TH | 7TH | 8TH | 9TH | 10TH | 11TH |
| MEAN | 4.97 | 2.47 | 2.27 | 0.68 | 0.66 | 0.49 | 0.49 | 0.43 | 0.26 | 0.11 | 0.09 | 0.13 |
| | 12TH | 13TH | 14TH | 15TH | 16TH | 17TH | 18TH | 19TH | 20TH | | | |
| MEAN | 0.07 | 0.19 | 0.08 | 0.24 | 0.43 | 0.16 | 0.05 | 0.05 | 0.05 | | | |

TABLE 11

| | RFV IN MODES | | | | | | | | | | | |
| --- | --- | --- | --- | --- | --- | --- | --- | --- | --- | --- | --- | --- |
| | OA | 1ST | 2ND | 3RD | 4TH | 5TH | 6TH | 7TH | 8TH | 9TH | 10TH | 11TH |
| MEAN | 5.38 | 2.93 | 2.03 | 1.14 | 0.75 | 0.48 | 0.49 | 0.43 | 0.27 | 0.14 | 0.13 | 0.14 |
| | 12TH | 13TH | 14TH | 15TH | 16TH | 17TH | 18TH | 19TH | 20TH | | | |
| MEAN | 0.13 | 0.08 | 0.06 | 0.05 | 0.41 | 0.02 | 0.03 | 0.01 | 0.02 | | | |

FIGS. 7A to 7E graphically show the mean RFVs shown in TABLEs 7 to 11.

The graphs of FIGS. 5A to 5D show the results of the tires which were produced using the contact member arrangements shown in FIGS. 4A to 4D. These graphs clarify the advantageous effects of: 1) the RFV generally decreasing as the variation mode proceeds to higher variation modes; and 2) there being no abrupt RFV rise in the high variation modes.

Figure 5E:
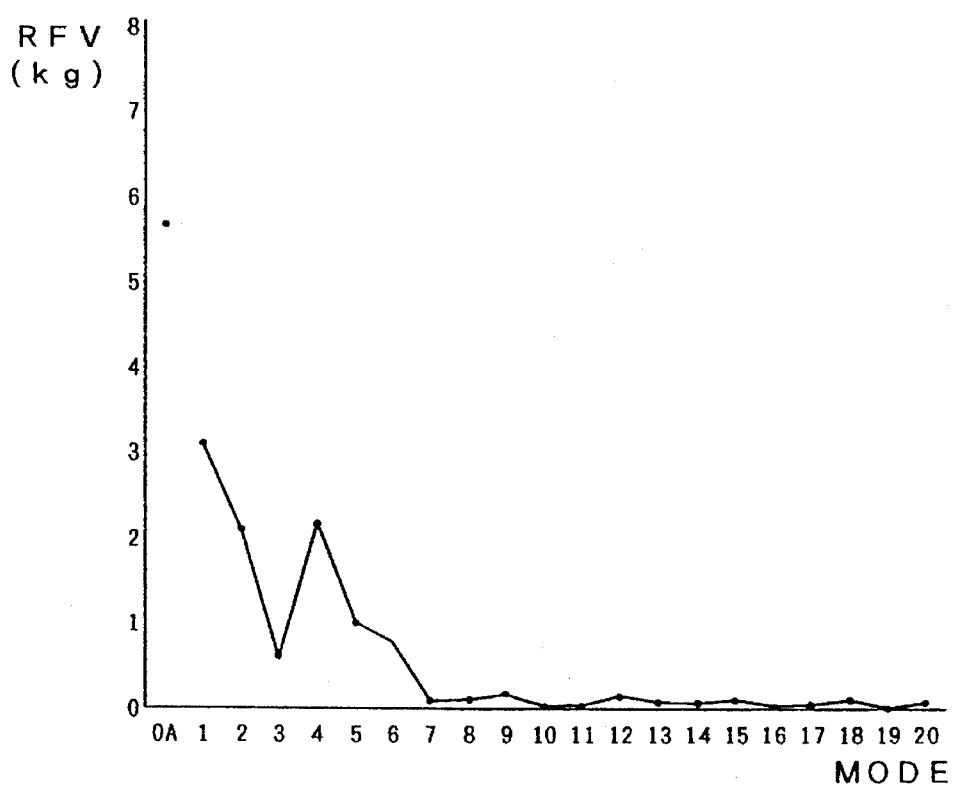
Figure 5F:
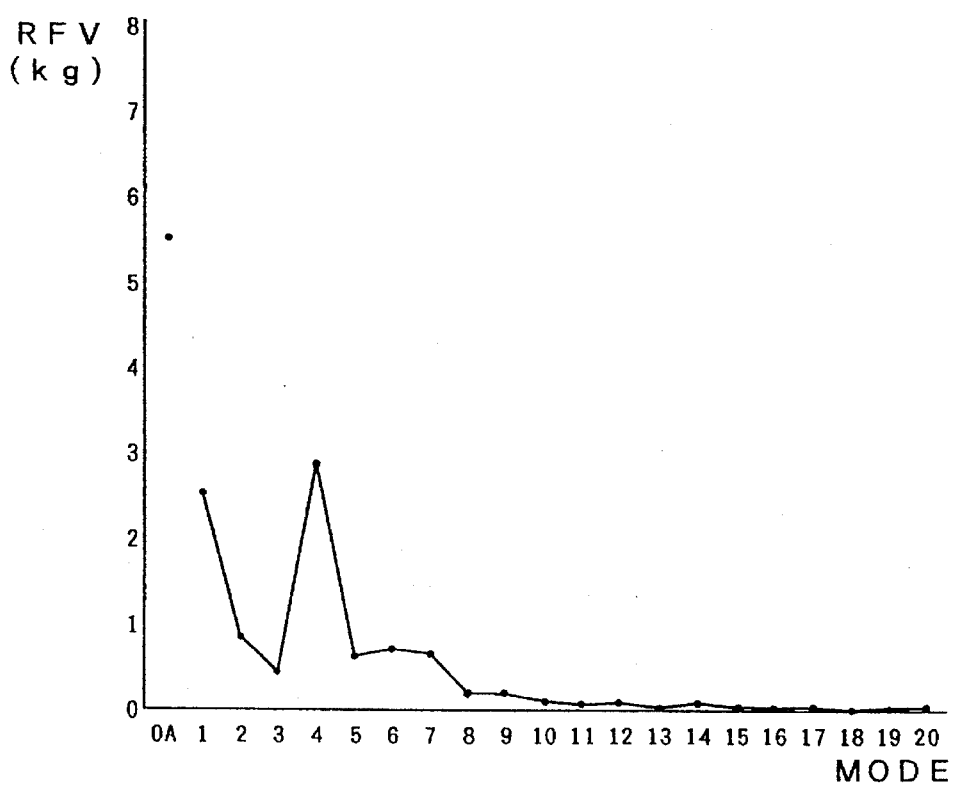

The graphs of FIGS. 5E and 5F show the results of the tires which were produced using the contact member arrangements shown in FIGS. 4E to 4F. These graphs also clarify the advantageous effect that there is no abrupt RFV rise in the high variation modes although the RFV of the fourth variation mode is high.

The graphs of FIGS. 7A to 7E show the results of the tires which were produced using the contact member arrangements shown in FIGS. 6A to 6E. These graphs show there are high RFVs in particular variation modes and further abrupt rises in the high variation modes. Specifically: in FIG. 7A, the second, fourth, and eighth variation modes have abrupt rises; in FIG. 7B, the sixth and eleventh variation modes have abrupt rises; in FIG. 7C, the third, sixth, ninth, and thirteenth variation modes have abrupt rises; in FIG. 7D, the sixteenth variation mode has an abrupt rise; and in FIG. 7E, the sixteenth variation mode has an abrupt rise. These high RFVs in the high variation modes will be liable to cause undesirable noises in the condition of the automotive vehicle being driven at high speed.

As shown in FIGS. 5A to 5F, lower or neglectable RFVs can be obtained by using the tread ring transferring apparatus 1 provided with contact members 7 arranged at different intervals.

The RFV can be further suppressed by arranging contact members 7 in such a manner that no interval between any adjacent two contact members 7 is equal to an angle which is obtained by dividing 360° by the number of contact members in the arrangement.

Also, it may be appreciated that the arrangement of contact members 7 is changed in accordance with the size or type of tread ring to be transferred to provide an arrangement suitable to the transferring tread ring. This will accomplish more precise suppression or RFVs.

What is claimed is:

1. A tread ring transferring apparatus for use in a green tire building system, comprising:

a holder frame in the form of a ring;

a plurality of holding segments carried by the holder frame and projecting from an inner surface of the holder frame, each holding segment being movable in radial directions of the holder frame and including (1) an arm member extending and being movable in radial directions of the holder frame, (2) a circumferentially extending supporting member attached on an inner end of the arm member and (3) at least one contact member attached on an inner surface of the supporting member, the contact members being attached at different locations on the inner surfaces of different ones of the supporting members to define different circumferential intervals between the contact members.

2. A tread ring transferring apparatus according to claim 1 wherein the contact members are arranged in such a manner that no interval between any adjacent two contact members is equal to an angle which is obtained by dividing 360° by the number of contact members in the arrangement.

3. A tread ring transferring apparatus according to claim 1 wherein the tread ring has a center flat portion and shoulder portions positioned axially outside the center flat portion, and the contact member is in the form of a rectangle whose axial width is equal to or smaller than an axial width of the center flat portion of the tread ring.

4. A tread ring transferring apparatus for use in a green tire building system, comprising:

a holder frame in the form of a ring;

a plurality of holding segments carried by the holder frame and projecting from an inner surface of the holder frame, each holding segment being movable in radial directions of the holder frame and including (1) an arm member extending and being movable in radial directions of the holder frame, (2) a circumferentially extending supporting member attached on an inner end of the arm member and (3) a contact member attached on an inner surface of the supporting member, the contact members being arranged in a circumferential direction at different intervals and each contact member being attachable at selective positions on the inner surface of the supporting member to change the circumferential arrangement of contact members.

* * * * *